United States Patent Office 3,271,401
Patented Sept. 6, 1966

3,271,401
TETRAZAINDENE SYNTHESIS FOR PHOTOGRAPHIC PRODUCTS
Leslie Alfred Williams, Wealdstone, England, assignor to Eastman Kodak Company, Rochester, N.Y., a corporation of New Jersey
No Drawing. Filed Aug. 20, 1964, Ser. No. 391,050
6 Claims. (Cl. 260—256.4)

This invention relates to the synthesis of certain tetrazaindene compounds, as well as photographic products stabilized therewith.

It is well known that certain tetrazaindene compounds can be synthesized by condensing an alkoxymethylenemalonic acid ester with a 3-amino-1,2,4-triazole. However, such condensations have traditionally been carried out under neutral or acidic conditions, and it has been found that substantially none of the 6-oxo-1,3,3a,7-tetrazaindene compounds are formed under acid conditions.

It is, therefore, an object of my invention to provide a method of preparing 6-oxo-1,3,3a,7-tetrazaindene compounds. A further object is to provide novel 6-oxo-1,3, 3a,7-tetrazaindene compounds. Still another object is to provide photographic emulsions which have been stabilized by treatment with small amounts of such tetrazaindene compounds. Other objects will become apparent from a consideration of the following description and examples.

I have found that the above objects can be accomplished by condensing an alkoxymethylenemalonic acid ester with a 3-amino-1,2,4-triazole compound under alkaline conditions. Many of the tetrazaindene compounds which can be obtained according to my invention can be represented by the following general formula:

I
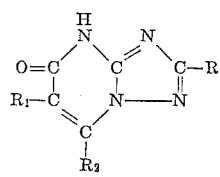

wherein R represents a hydrogen atom, an alkyl group, such as, for example, methyl, ethyl, propyl, isopropyl, butyl, isobutyl, etc. (e.g., an alkyl group containing from 1 to 4 carbon atoms), an aryl group of the benzene series, such as, for example, phenyl, o-, m- or p-tolyl, etc. (e.g., a monocyclic aryl group of the benzene series), an amino group, such as, for example, amino, methylamino, piperidyl, morpholinyl, etc., an alkylmercapto group, such as, for example, methylmercapto, ethylmercapto, etc., or a mercapto group, $R_1$ represents a hydrogen atom, a carboxyl group (including water-soluble salts thereof, such as, for example, sodium, potassium, pyridinium, triethanolammonium, etc.), or a carbalkoxyl group, such as, for example, carbomethoxyl, carboethoxyl, carbobutoxyl, etc., and $R_2$ represents a hyrodgen atom or a lower alkyl group, such as, for example, methyl, ethyl, etc.

According to my invention, the tetrazaindene compounds of Formula I, wherein $R_1$ represents a carbalkoxyl group, can be prepared by condensing one molecule of an alkoxymethylenemalonic acid ester of the following general formula:

II
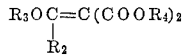

wherein $R_2$, $R_3$ and $R_4$ each represents a lower alkyl group, such as, for example, methyl, ethyl, propyl, butyl, etc., with one molecule of a 3-amino-1,2,4-triazole compound of the following general formula:

III
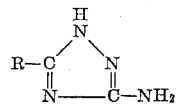

wherein R has the values given above. As indicated above, the condensation of the compounds of Formula II with those of Formula III is carried out under alkaline conditions. By alkaline conditions, I mean under conditions of a pH of at least about 8.0. Of course, more basic conditions than a pH of 8.0 can be employed, and it is to be understood that my invention is not limited to that particular pH condition. Suitable basic condensing agents include alkali metal alkoxides, such as sodium methoxide, sodium ethoxide, sodium propoxide, sodium butoxide, potassium ethoxide, etc. Alkali metal hydroxides can also be employed as basic condensing agents, typical examples of which include sodium hydroxide, potassium hydroxide, etc. The condensation can be carried out in the presence of an inert diluent, such as a lower alcohol (e.g. methanol, ethanol, propanol, etc.), 1,4-dioxane, diethyl ether, etc.

The condensations can be accelerated by heating although temperatures varying from ambient temperatures (ca. 25° C.) to the reflux temperature of the reaction mixture can be employed.

The tetrazaindene compounds of Formula I above, wherein $R_1$ represents a carboxyl group, can be obtained by de-esterifying the compounds of Formula I, wherein $R_1$ represents a carbalkoxyl group. De-esterification can be effected by simply heating the esterified derivatives in the presence of a strongly alkaline aqueous solution, such as an aqueous solution of sodium hydroxide, potassium hydroxide, etc. The free acid compounds ($R_1$ is carboxyl) can be obtained by simply acidifying the de-esterification mixture.

The compounds of Formula I, wherein $R_1$ represents a hydrogen atom, can be obtained by decarboxylation of the compounds of Formula I, wherein $R_1$ represents a carboxyl group. Decarboxylation can be effected by simply heating the carboxyl derivatives on an oil bath at a temperature of at least about 250° C.

As indicated above, the condensation of the compounds of Formula II with those of Formula III can be affected under basic conditions to provide the 6-oxo compounds of my invention. A very strongly basic agent, such as sodium ethoxide, will give entirely, or almost entirely, the 6-oxo compound of Formula I accompanied by little, or none, of the corresponding isomeric 4-oxo compounds of the prior art. When R of Formula III is not strongly electron donating, e.g. hydrogen, lower alkyl or mercapto, it is frequently possible to use a rather weak basic condensing agent, such as pyridine, a lutidine, a collidine, etc., in which case there is obtained a large yield of the 6-oxo compound of my invention, or a mixture containing the 6-oxo compound, together with some isomeric 4-oxo compound, from which the 6-oxo compound can be easily separated. When R of Formula III is strongly electron donating, such as amino, a very strong basic condensing agent, such as sodium ethoxide, should be employed.

The following examples will serve to illustrate more fully the manner of preparing 6-oxo-1,3,3a,7-tetrazaindene compounds according to my invention.

Example 1.—5-ethoxycarbonyl-4-6-oxo-1,3,3a,7-tetrazaindene

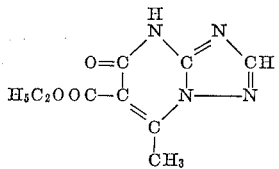

Sodium (4.6 g.) was dissolved in alcohol (120 cc.) and to this solution 3-amino-1,2,4-triazole (16.8 g.) and diethyl-α-ethoxyethylidenemalonate (46.0 g.) were added. The mixture was refluxed for 6 hours after which water (120 cc.) was added, the solution was chilled and acidified with concentrated hydrochloric acid. The product was collected and recrystallized from water as colorless crystals, M.P. 208° C. Yield 26 g. (Found C, 48.5; H, 4.9; N, 25.4; $C_9H_{10}N_4O_3$ requires C, 48.6; H, 4.5; N, 25.3%.)

Example 2.—5-carboxy-4-methyl-6-oxo-1,3,3a,7-tetrazaindene

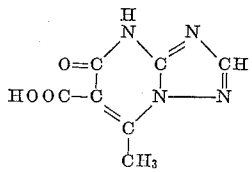

The above ester (26 g.) was refluxed in 10% aqueous caustic soda solution (150 cc.) for 1 hour. After cooling, the solution was acidified with concentrated hydrochloric acid and chilled. The product (21 g.) was recrystallized from water as colorless crystals, M.P. 228–229° C. with gas evolution. (Found C, 43.6; H, 3.4; N, 29.7; $C_7H_6N_4O_3$ requires C, 43.3; H, 3.1; N, 28.9%.)

Example 3.—4-methyl-6-oxo-1,3,3a,7-tetrazaindene

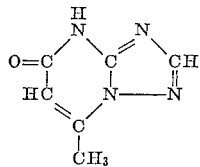

The acid obtained in Example 2 (5 g.) was heated under vacuum in an oil-bath at 280° C. The solid melted with evolution of gas and the product sublimed into a short air condenser. It (3 g.) was recrystallized from water as colorless plates, M.P. 266–267° C. (Found C, 47.8; H, 4.1; N, 37.5; requires C, 48.0; H, 4.0; N, 37.3%.)

Example 4.—5-ethoxycarbonyl-4-methyl-2-methylthio-6-oxo-1,3,3a,7-tetrazaindene

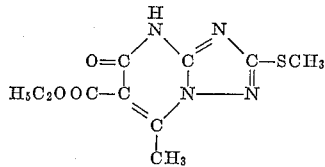

Sodium (2.3 g.) was dissolved in alcohol (60 cc.) and to this solution diethyl α-ethoxyethylidenemalonate (23.0 g.) and 3-amino-5-methylthio-1,2,4-triazole (13.0 g. Ber. 54B 2089 (1921)) were added. The mixture was refluxed for 1.5 hours by which time the whole had set to a solid. Water (60 cc.) was added and the solution chilled and acidified with concentrated hydrochloric acid to give colorless crystals which were recrystallized from 50% acetic acid as glistening needles, M.P. 214° C. Yield 12 g. (Found C, 44.3; H, 4.6; N, 20.3; S, 11.9; $C_{10}H_{12}N_4O_3S$ requires C, 44.7; H, 4.8; N, 20.8; S, 11.9%.)

Example 5.—5-carboxy-4-methyl-2-methylthio-6-oxo-1,3,3a,7-tetrazaindene

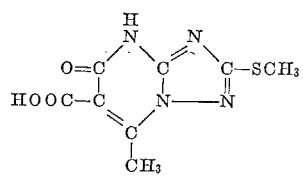

5-ethoxycarbonyl-4-methyl-2-methylthio-6-oxo-1,3,3a,7-tetrazaindene (2.2 g.) was refluxed in 10% aqueous caustic soda solution (20 cc.) for 1 hour, after which the solution was cooled and acidified with concentrated hydrochloric acid. The precipitate (1.5 g.) was collected and washed with water and recrystallized from water as colorless crystals, M.P. 236° C.

Example 6.—4-methyl-2-methylthio-6-oxo-1,3,3a,7-tetrazaindene

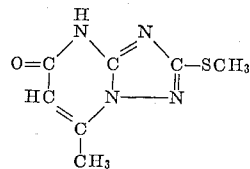

5 - carboxy-4-methyl-2-methylthio-6-oxo-1,3,3a,7-tetrazaindene was heated under vacuum to its melting point until the evolution of carbon dioxide ceased. The product was recrystallized from water as colorless needles, M.P. 280–281° C. (Found C, 42.2; H, 4.3; N, 28.9; S, 16.3; $C_7H_8N_4OS$ requires C, 42.6; H, 4.6; N, 28.4; S, 16.3%.)

Example 7.—2-amino-5-ethoxycarbonyl-4-methyl-6-oxo-1,3,3a,7-tetrazaindene

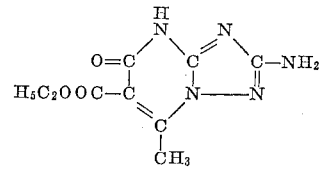

2,5-diamino-1,2,4-triazole (9.9 g.) and diethyl α-ethoxyethylidenemalonate (23.0 g.) were refluxed together in ethanol (60 cc.) in which sodium (2.3 g.) had previously been dissolved. After 3–3.5 hours, water (60 cc.) was added and the solution acidified. The solid (5 g.) was collected and recrystallized from water as needles, M.P. >300° C. (Found C, 45.2; H, 4.7; N, 29.9; $C_9H_{11}N_5O_3$ requires C, 45.5; H, 4.6; N, 29.6%.)

Example 8.—2-amino-5-carboxy-4-methyl-6-oxo-1,3,3a,7-tetrazaindene

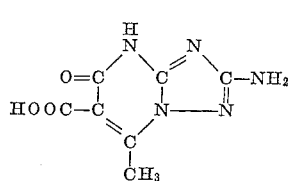

The ester made as in Example 7 (4 g.) was refluxed in 10% aqueous caustic soda solution (40 cc.) for 1 hour. After cooling, the product was precipitated by the addition of concentrated hydrochloric acid. It (2.5 g.) was purified by dissolving in caustic soda, treating the solution with charcoal and re-precipitating with hydrochloric acid. The product was suspended in boiling water to remove all inorganic impurities, M.P. 360° C. (Found C, 40.0; H, 3.5; N, 33.5; $C_7H_7N_5O_3$ requires C, 40.2; H, 3.4; N, 33.5%.)

Example 9.—2-amino-4-methyl-6-oxo-1,3,3a,7-tetrazaindene

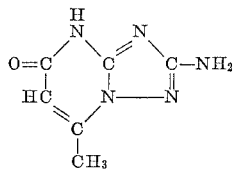

The above acid (Example 8, 1.5 g.) was heated under vacuum until all had sublimed into a short air condenser. (The starting material did not melt.) The product was collected and recrystallized from water as colorless needles, M.P. 357° C. Yield 1 g. (Found C, 43.3; H, 4.4; N, 42.9; $C_6H_7N_5O$ requires C, 43.6; H, 4.2; N, 42.4%.)

The following example will serve to illustrate a different preparation for the compound of Example 1 above, using a weak basic condensing agent, such as pyridine.

Example 10.—5-ethoxycarbonyl-4-methyl-6-oxo-1,3,3a,7-tetrazaindene 3-amino-1,2,4-triazole (4.2 g.) and diethyl-α-ethoxyethylidenemalonate (11.5 g.) were refluxed together in pyridine (30 cc.) for 16 hours. During this reaction, both the required 6-oxo compound and the isomeric 4-oxo compound are formed. After cooling this mixture, ether (90 cc.) was added, and the mixture was shaken for about 2 minutes. The precipitate, which contains the 4-oxo compounds as a pyridinium salt, was collected and discarded. The 6-oxo compound, which separated upon cooling the ethereal filtrate for several hours, was collected and recrystallized from water. Yield—3 g., M.P. 208° C. (Found C, 48.5; H, 4.9; N, 25.4; $C_9H_{10}N_4O_3$ requires C, 48.6; H, 4.5; N, 25.3%.)

I have also found an improved method for making the intermediate starting compounds of Formula II which gives surprisingly higher yields than the known methods of making these compounds. According to this improved method, an alkyl orthoacetate is condensed with an alkyl malonate, preferably with heating, in the presence of a basic condensing agent, such as an alkali metal alkoxide (e.g. sodium ethoxide, potassium ethoxide, sodium propoxide, etc.), an alkali metal hydroxide (e.g. sodium hydroxide, potassium hydroxide, etc.). The following example will serve to illustrate the preparation of such an intermediate.

Example 11.—Diethyl-α-ethoxyethylidenemalonate

Ethyl orthoacetate (324 g.), ethyl malonate (320 g.) and powdered anhydrous potassium hydroxide (5.6 g.) were heated together in an oil-bath. The temperature was raised during ½ to ¾ hour to 170° C. by which time the distillation of alcohol commenced, and was collected after fractionation through a short column. Heating was continued and the temperature raised as necessary to maintain the distillation of the alcohol. After about 4 hours (bath temperature 205° C.) the distillation of alcohol ceased (200 ccs. were collected). The reaction mixture was allowed to cool to 80° C., a vacuum was applied and heating was recommended. A small fore-run (below B.P. at 96/2 mm. pressure) was obtained and discarded, while the crude product was collected between 96–130° C. at 2 mm. pressure. This fraction was re-distilled and the fraction boiling between 96–98° C., (2 mm.) was collected and was purified further by the method described by McElvain and Burkett in the J.A.C.S., vol. 64, page 1831 to give 180 grams of the required compound as crystals, M.P. 25–27° C. (Found C, 57.5; H, 8.1; $C_{11}H_{18}O_5$ requires C, 57.4; H, 7.8%.)

Example 12

One molar equivalent of 3-amino-1,2,4-triazole was reacted with one molar equivalent of diethyl-α-ethoxyethylidenemalonate by heating the reaction components at a temperature ranging from 100–120° C. in glacial acetic acid for a period of 1 to 3 hours. The aminotriazole salt of the 4-hydroxytetrazaindene was obtained and the 4-hydroxytetrazaindene liberated from the salt by treatment with hydrochloric acid. None of the 6-hydroxy compound could be isolated from the reaction mixture.

Diethyl ethoxymethylenemalonate, when reacted with 3-amino-1,2,4-triazole under acid, neutral and strongly basic conditions gave solely the 4-hydroxytetrazaindene. This shows that the presence of the alkyl group in the beta position of the unsaturated ester is of great importance in controlling the course of the reaction by the use of a basic reaction medium.

The 6-oxo compounds of my invention can be added to ordinary photographic silver halide emulsions in order to stabilize such emulsions and prevent the formation of fog upon storage of these emulsions, particularly under adverse conditions, such as high temperatures and humidity.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

The 6-oxo compounds of my invention can be used in a variety of photographic silver halide emulsions, including those used in the manufacture of fast negative materials and X-ray elements. The stabilizing compounds of my invention cause an elevation in the emulsion speed when using high intensity exposures, while the low intensity speed is not impaired to the degree associated with other related and isomeric stabilizers. It has also been found that many of the 6-oxo compounds of my invention have little or no detectable effect upon the spectral sensitivity of photographic silver halide emulsions containing them, while this is not true for many other tetrazaindene stabilizing compounds.

The following data will serve to illustrate the useful stabilizing or antifoggant effect of many of the compounds represented by Formula I of my invention. These data were obtained using an ordinary high-speed silver bromoiodide emulsion (negative type) which had been panchromatically sensitized with a cyanine dye. The sensitized emulsion was divided into several batches, and each batch was separately treated with a quantity of stabilizing compound in the amount shown in the tables. One batch of each emulsion was not treated and this particular batch served as a control. The separate batches of emulsion were then coated on an ordinary support, such as cellulose acetate and dried. Samples of the dried coatings were then immediately exposed on an Eastman Ib Sensitometer with tungsten illumination and developed for 5 minutes in Kodak Developer DK–50 at 68° F.

with good agitation. The developed coatings were then fixed, washed and dried in the usual manner. The relative speeds, gammas and fogs of each of the coatings were then measured in the usual manner.

Separate samples of the above coatings were incubated for 2 weeks at 120° F. with constant humidity and the incubated strips were then exposed and processed exactly as the fresh coatings. The relative speeds, gammas and fogs for the various coatings were then measured as before. The relative speeds in each instance are inversely proportional to the exposure required to produce a developed density of 0.3 above fog. The DK-50 Developer has the following formula:

| | Grams |
|---|---|
| N-methyl-p-aminophenol sulfate | 2.5 |
| Hydroquinone | 2.5 |
| Sodium sulfite (desiccated) | 30.0 |
| Sodium metaborate | 10.0 |
| Potassium bromide | 0.5 |

Water to make 1.0 liter.

The following data were obtained:

wherein R represents a member selected from the class consisting of H, lower alkyl, phenyl, tolyl, amino, methylamino, mercapto, methylmercapto and ethylmercapto groups.

2. A process for preparing 6-oxo-1,3,3a,7-tetrazaindene compounds useful in stabilizing photographic silver halide emulsions comprising condensing in the presence of an alkali metal alkoxide one molecule of an alkoxymethylenemalonic acid ester having the following formula:

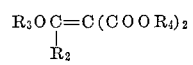

wherein $R_2$, $R_3$ and $R_4$ each represents a lower alkyl group, with one molecule of a triazole compound having the following formula:

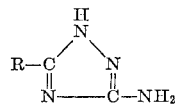

TABLE A

| Coating Number | Description g./Ag mole) | G. | Fresh Tests | | | 2 Weeks Inc., 120° F. | | Fog |
|---|---|---|---|---|---|---|---|---|
| | | | Rel. Speed | γ | Fog | Rel. Speed | γ | |
| (a) | Control | | 100 | 1.13 | .11 | 37 | 0.67 | .61 |
| (b) | 5-carboxy-4-methyl-6-oxo-1,3,3a,7-tetrazaindene. | 1.6 | 68 | 1.42 | .08 | 65 | 1.15 | .14 |
| (c) | Control | | 100 | 1.07 | .10 | 71 | 0.75 | .34 |
| (d) | 4-methyl-6-oxo-1,3,3a,7-tetrazaindene | 3.0 | 85 | 1.15 | .09 | 105 | 0.98 | .12 |
| (e) | 5-ethoxycarbonyl-4-methyl-6-oxo-1,3,3a,7-tetrazaindene. | 3.0 | 85 | 1.12 | .09 | 100 | 1.00 | .11 |
| | | | | | | 1 Week Inc., 120° F. | | |
| (f) | Control | | 100 | 1.17 | .15 | 82 | 1.00 | .33 |
| (g) | 5-ethoxycarbonyl-4-methyl-2-methylthio-6-oxo-1,3,3a,7-tetrazaindene. | .15 | 102 | 1.27 | .12 | 100 | 1.15 | .14 |
| (h) | 5-carboxy-4-methyl-2-methylthio-6-oxo-1,3,3a,7-tetrazaindene. | .15 | 95 | 1.23 | .12 | 97 | 1.17 | .13 |
| (i) | 2-amino-5-ethoxycarbonyl-4-methyl-6-oxo-1,3,3a,7-tetrazaindene. | .75 | 105 | 1.18 | .13 | 95 | 1.03 | .25 |
| (j) | 2-amino-5-ethoxycarbonyl-4-methyl-6-oxo-1,3,3a,7-tetrazaindene. | 3.0 | 82 | 1.17 | .12 | 80 | 1.08 | .11 |
| (k) | 2-amino-5-carboxy-4-methyl-6-oxo-1,3,3a,7-tetrazaindene. | .75 | 68 | 1.30 | .11 | 74 | 1.17 | .14 |
| (l) | 2-amino-4-methyl-6-oxo-1,3,3a,7-tetrazaindene | 2.25 | 89 | 1.17 | .12 | 100 | 1.05 | .13 |

The invention has been described in detail with particular reference to preferred embodiments thereof, but it will be understood that variations and modifications can be effected within the spirit and scope of my invention as described hereinabove and as defined in the appended claims.

This application is a continuation-in-part of U.S. application Serial No. 86,007, filed January 31, 1961 (now abandoned).

I claim:

1. A method for preparing 6-oxo-1,3,3a,7-tetrazaindene compounds useful in stabilizing photographic silver halide emulsions comprising condensing under alkaline conditions at a pH of at least 8.0 one molecule of an alkoxymethylenemalonic acid ester having the following formula:

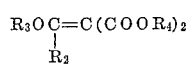

wherein $R_2$, $R_3$ and $R_4$ each represents a lower alkyl group, with one molecule of a triazole compound having the following formula:

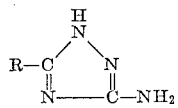

wherein R represents a member selected from the class consisting of H, lower alkyl, phenyl, tolyl, amino, methylamino, mercapto, methylmercapto and ethylmercapto groups.

3. A process for preparing 6-oxo-1,3,3a,7-tetrazaindene compounds useful in stabilizing photographic silver halide emulsions comprising condensing in the presence for an alkali metal alkoxide one molecule of a di lower alkyl α-ethoxyethylidenemalonate with one molecule of a 3-amino-1,2,4-triazole compound having the following formula:

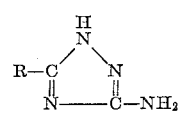

wherein R represents a member selected from the class consisting of H, lower alkyl, phenyl, tolyl, amino, methylamino, mercapto, methylmercapto and ethylmercapto groups.

4. A process for preparing 5-ethoxycarbonyl-4-methyl-6-oxo-1,3,3a,7-tetrazaindene comprising condensing at a pH of at least 8.0, one molecule of diethyl α-ethoxyethylidenemalonate with one molecule of 3-amino-1,2,4-triazole.

5. A process for preparing a 5-ethoxycarbonyl-4-methyl-2-methylthio-6-oxo-1,3,3a,7 - tetrazaindene comprising condensing at a pH of at least 8.0, one molecule of diethyl α-ethoxylidenemalonate with one molecule of 3-amino-5-methylthio-1,2,4-triazole.

6. A process for preparing 2-amino-5-ethoxycarbonyl-4-methyl-6-oxo-1,3,3a,7 - tetrazaindene comprising condensing at a pH of at least 8.0, one molecule of diethyl α-ethoxyethylidenemalonate with one molecule of 2,5-diamino-1,2,4-triazole.

References Cited by the Examiner

UNITED STATES PATENTS

| | | | |
|---|---|---|---|
| 2,526,477 | 10/1950 | Heimbach | 260—256.4 |
| 2,566,658 | 9/1951 | Fry | 260—256.4 |
| 2,837,521 | 6/1958 | Burness | 260—256.4 |

OTHER REFERENCES

Elderfield: Heterocyclic Compounds, vol. 6, John Wiley & Sons Inc., New York, 1957, pages 236–248 and 280.

ALEX MAZEL, *Primary Examiner.*
HENRY R. JILES, NICHOLAS S. RIZZO, *Examiners.*
MARY U. O'BRIEN, *Assistant Examiner.*